United States Patent [19]
Blangetti et al.

[11] Patent Number: 5,201,366
[45] Date of Patent: Apr. 13, 1993

[54] PROCESS AND EQUIPMENT FOR THE PREHEATING AND MULTI-STAGE DEGASSING OF WATER

[75] Inventors: Francisco Blangetti, Baden, Switzerland; Hans Eisenbeis, Lienheim, Fed. Rep. of Germany; Mustafa Youssef, Zürich, Switzerland

[73] Assignee: ASEA Brown Boveri Ltd., Baden, Switzerland

[21] Appl. No.: 721,305

[22] Filed: Jun. 26, 1991

[30] Foreign Application Priority Data

Jun. 28, 1990 [CH] Switzerland ............ 2162/90

[51] Int. Cl.⁵ ............ B01D 19/00; B01F 3/04
[52] U.S. Cl. ............ 165/112; 165/917; 55/39; 55/194; 55/198
[58] Field of Search ............ 165/112, 114, 917; 55/39, 198, 194

[56] References Cited

U.S. PATENT DOCUMENTS

| | | | |
|---|---|---|---|
| 2,663,547 | 12/1953 | Evans, Jr. et al. | 165/112 |
| 2,677,433 | 5/1954 | Kretzschmar | 55/198 |
| 3,892,548 | 7/1975 | Gardey | 55/194 |
| 4,592,419 | 6/1986 | Ishida et al. | 165/112 |

FOREIGN PATENT DOCUMENTS

| | | |
|---|---|---|
| 1151518 | 7/1963 | Fed. Rep. of Germany . |
| 1167397 | 11/1958 | France . |
| 52982 | 3/1983 | Japan ............ 165/917 |
| 802149 | 10/1958 | United Kingdom . |

Primary Examiner—Albert W. Davis, Jr.
Attorney, Agent, or Firm—Oblon, Spivak, McClelland, Maier & Neustadt

[57] ABSTRACT

Equipment for the three-stage preheating and degassing of make-up water by means of steam in a power generation installation comprises, in a first stage, a mixing chamber (3) which is located on the outside wall (2) of the condenser of the power generation installation and communicates with the condenser interior via a steam inlet (6) and steam outlet (8). In this mixing chamber, a plurality of water injection means (4) are arranged. A separation column (11) which is located upright underneath the mixing chamber (3) and which is fitted at its upper end with a water distributor (15), forms the second stage. A receiver (21), which is located underneath the separation column (11) and in which steam-dispersing means (22) are fitted and which is connected via a weir (23) to the condenser interior, forms the third stage.

6 Claims, 2 Drawing Sheets

PROCESS AND EQUIPMENT FOR THE PREHEATING AND MULTI-STAGE DEGASSING OF WATER

BACKGROUND OF THE INVENTION

1. Field of the Invention

The invention relates to a process for the preheating and multi-stage degassing of make-up water by means of steam in a power generation installation. It also relates to equipment for carrying out the process.

In modern power station installations, the consumption of make-up water is very high. Thus, even conventional condensation units normally require, as make-up water, 1 to 3% of the total circulating mass flow of the steam/condensate circulation. In combination installations, however, where the emission of nitrogen oxides is reduced by means of steam injection, this consumption of make-up water can rise up to 20 to 30%. Owing to the current requirements, a degassing range of the $O_2$ in make-up water from 10,000 ppb (parts per billion)—i.e. the state of saturation of the water with atmospheric air at room temperature—down to 7 ppb is then demanded, with simultaneous heating by 20K and more.

2. Discussion of Background

The simple, direct spraying, known per se and conventional in the case of small water rates, of makeup water into the condenser would cause flooding of the tube bundles, because of the large quantities mentioned. This would entail severe impairment of the functioning of the condenser and is therefore not permitted, either by the condenser supplier or by the condenser operator. Moreover, the desired preheating and degassing cannot be achieved in this way.

The use of the generally known types of equipment for preheating and degassing of the make-up water normally has the result that the steam used for the preheating is at a relatively high energy level. Accordingly, a means is used which could readily still perform work in the turbo group.

In connection with the degassing of liquids, exchange towers or columns are also known in which the vapor and the liquid of a mixture flow in counter-current, in cross/counter-current or in co-current relative to one another (LUEGER, volume 16, Lexikon der Verfahrenstechnik [Dictionary of Process Engineering], fourth edition, Deutsche Verlags-Anstalt Stuttgart, page 51). In these columns, the liquid and the vapor of a mixture which is to be separated flow in counter-current or in co-current relative to one another in such a way that both phases are in the most intimate contact possible for mass transfer and heat exchange. The use of a degasser column in counter-current arrangement is correct in principle for achieving a maximum separation effect at a defined column height. In the case of a counter-current arrangement, however, greater liquid flows having greater subcooling lead to the problem that a very large part of the vapor must overcome the lower part of the column (flooding of the packing because of higher vapor loading), without significant action on the mass-kinetic separation effect, which occurs in the lower part of the column, since the preheating and the saturation process of the liquid take place in the upper part. The consequence of such a design solution is, however, that the diameter of the column must be enormously increased in order to prevent flooding of the packing, with considerable additional costs for the equipment.

Finally, it is also known, at least in connection with the corrosion problem in the feed water train of steam turbine installations, to carry out a post-degassing of the condensate by blowing steam into the hot well below the water level. A sufficiently large coverage with condensate and a sufficiently fine steam distribution in the condensate are hen necessary for blowing in steam.

SUMMARY OF THE INVENTION

On the basis of the knowledge that the heat of the waste steam arising in the condenser of a power generation installation is as a rule regarded as an undesired waste product, the invention is based on the object of conceiving a novel process using this waste heat and associated novel equipment with both a high preheating performance and a high degassing performance.

According to the invention, this is achieved in a multi-stage process, when in a first stage, the preheating and stripping of the gases dissolved in the make-up water proceeds on a purely thermodynamic basis, the subcooled make-up water being injected into a mixing chamber which is at least approximately under the condenser pressure and into which low-pressure waste steam is also introduced, in a second stage, the further degassing of the preheated make-up water is carried out on a purely mass-kinetic basis, the make-up water flowing downwards through an upright separation column and coming therein into intimate contact with flushing steam passed through the separation column in counter-current, and in a third stage, the make-up water leaving the separation column is treated in a receiver with steam bubbles which are generated by steam-dispersing means below the water level in the receiver, and the steam leaving the receiver forms the flushing steam for the separation column.

Equipment for carrying out this process essentially comprises a mixing chamber which is located on the outside wall of the condenser of the power generation installation and communicates with the condenser interior via a steam inlet and steam outlet and in which a plurality of water injection means are arranged, the steam inlet of the mixing chamber opening towards the condenser neck, also a separation column which is located upright underneath the mixing chamber and connected thereto and which is fitted at its upper end with a water distributor, a connection to the condenser interior branching off in the wall of the separation column between the water distributor and the elements of the separation column, and a receiver which is located underneath the separation column and connected thereto and in which steam-dispersing means are fitted and which is connected via a weir to the condenser interior.

The novel process and the novel degasser type are distinguished in that, in contrast to the conventional methods and designs, the power station efficiency is enhanced, since low-grade waste steam is predominantly used for the preheating and degassing, so that the condenser load is reduced.

It is particularly advantageous when the mixing chamber extends in the longitudinal direction of the condenser tubes and has an at least approximately cylindrical shape, both its steam inflow introduced from the condenser neck and its steam outflow being designed to be tangential. Owing to this hydrodynamic design of the inlet and outlet geometry of the mixing chamber, the return of the steam enriched with inert gases from the mixing chamber into the condenser takes place continuously and without extraneous intervention.

It is appropriate if the steam-dispersing means are two-phase nozzles which are charged both with preferably low-oxygen steam and recirculated condensate. The novel equipment can therefore also be utilized for purifying the condensate on start-up or during operation of the power station installation, by simply increasing the condensate mass flow which is required anyway for the functioning of the two-phase nozzles.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings referring to the cold end of a steam turbine installation, wherein.

Figure 1:
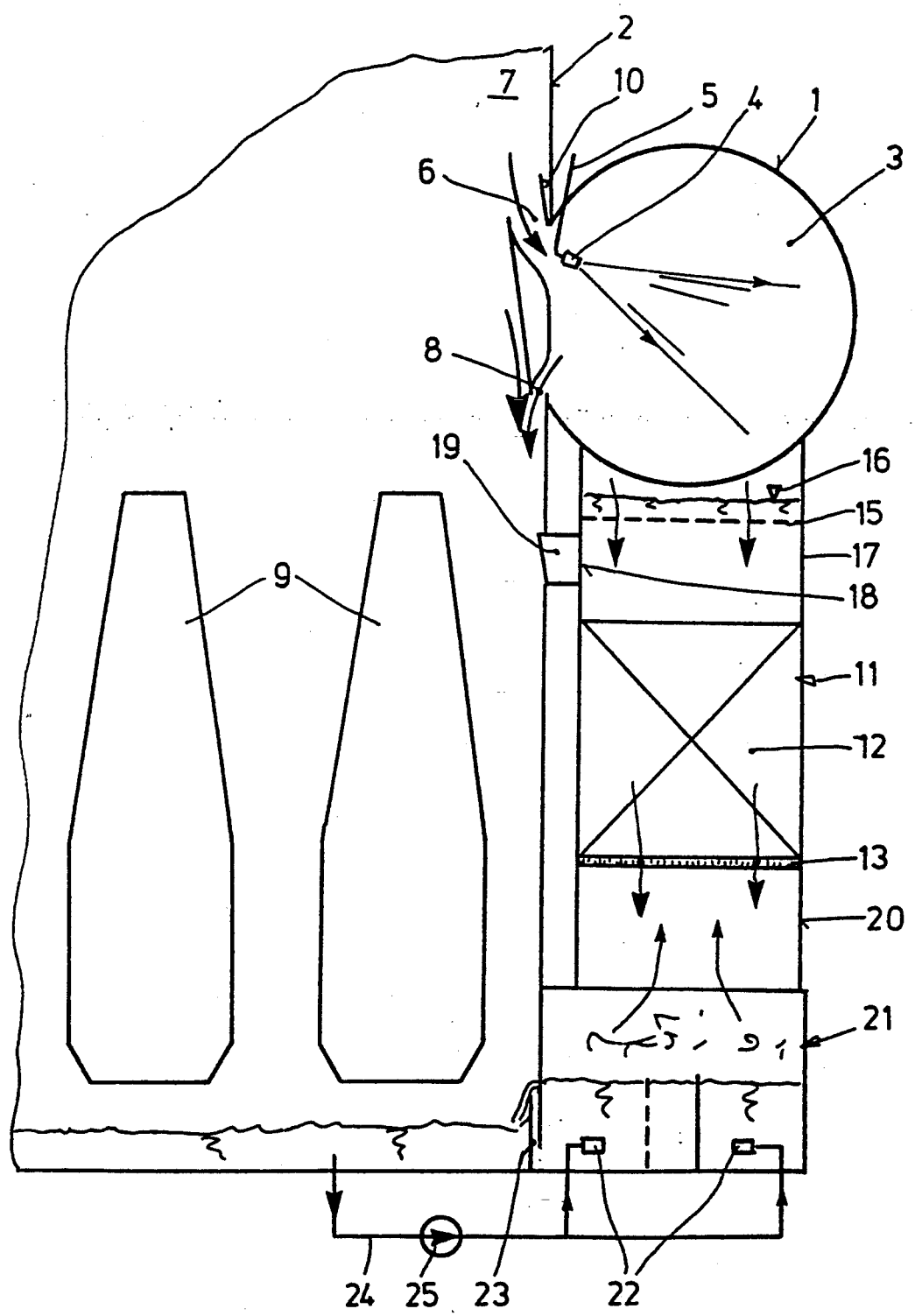
FIG. 1 shows a partial section through a condenser with integrated degassing equipment, transversely to the longitudinal extent of the condenser tubes.
Figure 2:
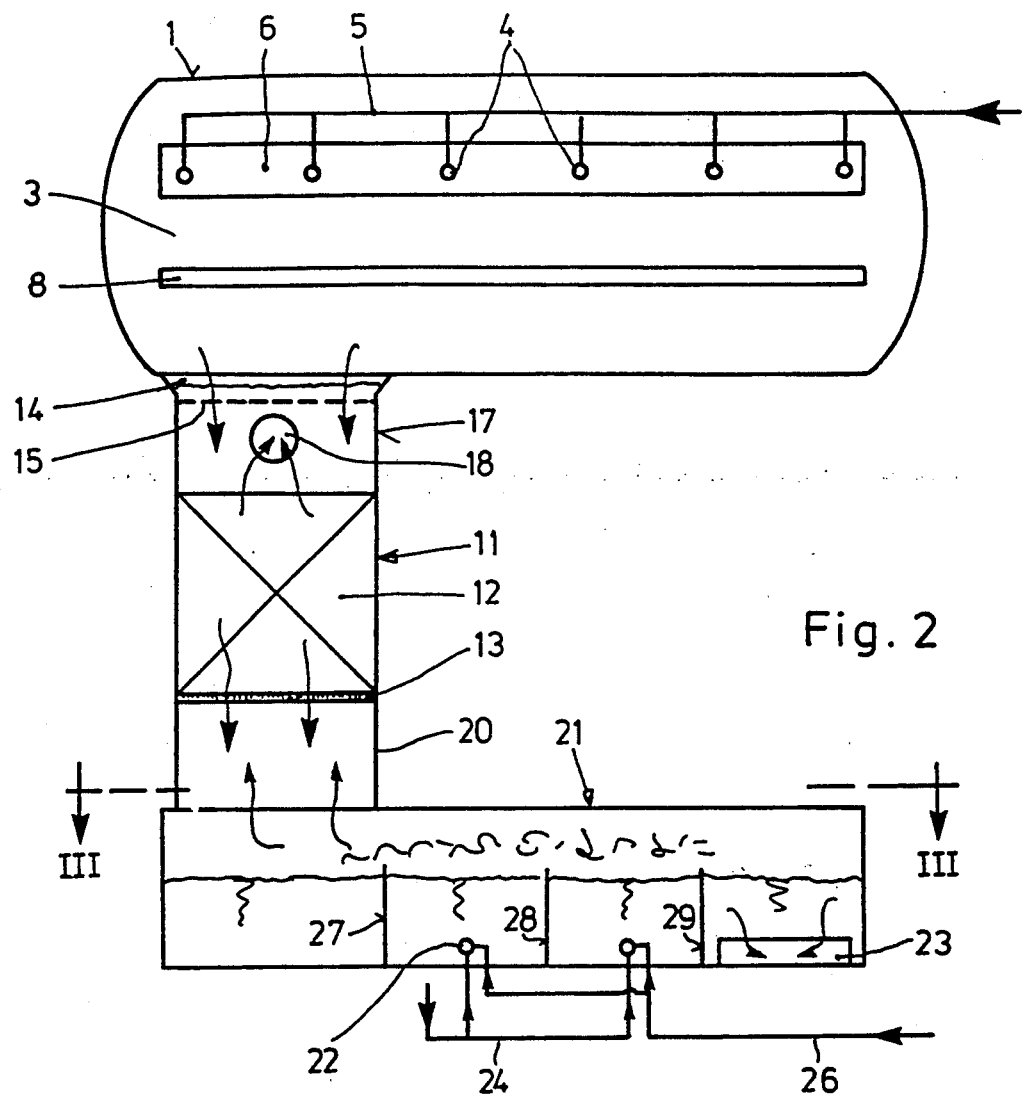
FIG. 2 shows a partial section through the degassing equipment in the longitudinal direction of the condenser tubes.

All parts of the installation which are not essential to an understanding of the invention, such as, for example, the actual steam and water circulation of the power generation installation, are not shown. The directions of flow of the media concerned are marked by arrows.

DESCRIPTION OF THE PREFERRED EMBODIMENTS

Before referring to the drawings, wherein like reference numerals designate identical or corresponding parts throughout the several views, the problems of mixing preheaters/degassers, whose structure and function are adequately known, and the multi-stage solution found here will be explained by reference to a non-specific numerical example:

The degassing with simultaneous preheating, such as typically occurs in power station installations, shows a few special features. First of all, saturated low-pressure steam, as a rule turbine exit steam, is available for preheating the make-up water. This steam has a moisture content of more than 10% and its temperature is normally between 20° and 50° C. The steam mass flow which is extracted from the subcooled make-up water and which as a rule flows into a surface condenser, is therefore mainly determined by the subcooling of the make-up water, relative to the saturation temperature of the turbine exit steam. In other words, in the degasser, a natural steady state is established which depends only on the states and intensity of the streams involved, without the influence of a control loop for controlling the said action parameters.

The stripping of the gases dissolved in the liquid initially takes place in a first stage on a purely thermodynamic basis, since the lowering of the pressure due to the spraying and the rise in the temperature of the make-up water causes a reduction in the saturation values of the dissolved gases (bubble effect) due to the preheating with steam. As a result, the partial pressure of the dissolved gases exceeds the prevailing total pressure. In the degassing range desired here, the major part of the total steam necessary is required for preheating and degassing in this stage of the process. On the basis of an initial $O_2$ concentration of 10,000 ppb at 20° C., the result is a decrease in the concentration to about 1,800 ppb at 100 mbar and a saturation temperature of 46° C., each kg of make-up water already requiring about 0.050 kg of dry, saturated steam for preheating up to the saturation temperature. The removal of the oxygen present in the gas phase after this firs..t stage is accomplished by discharging the residual steam flow enriched with inert gases. For this purpose, a fraction of the steam introduced into the degassing chamber and enriched with the stripped gases is passed back into the condenser chamber again. From there, it is transported out of the installation by means of the extraction system (not shown) of the condenser. Essentially, in this first stage, the make-up water is thus freed of a major part of the gases, i.e. oxygen, but also nitrogen and carbon dioxide, as a result of the make-up water being subjected to a vacuum and assuming the corresponding saturation conditions.

The part of the equipment required for this first degassing and preheating stage is essentially constructed as follows: It is a cylinder 1 which extends lying horizontally along the condenser wall 2 and is closed at both its ends by dished heads. The cylinder interior forms the actual mixing chamber 3. In this mixing chamber 3, a multiplicity of water injection means in the form of nozzles 4 are arranged in rows. These nozzles are supplied via a common water line 5. The subcooled make-up water with the high $O_2$ concentration is sprayed via the nozzles into the mixing chamber. The cylinder is connected to the condenser interior by two openings extending over the entire length of the mixing chamber. The upper opening forms the steam inlet 6 and is directed towards the only partially shown condenser neck 7. Directly above this opening, there is, inside the condenser on the wall thereof, a wall water separator in the form of a channel 10. This channel extends over approximately the same length as the mixing chamber; it is open at both ends, so that the water collected either runs off from there into the mixing chamber or remains in the condenser interior, depending on the length of the channel. In any case, this wall water is unable to impair the functioning of the mixing chamber. On the mixing chamber side, the inlet 6, shaped in conformity with the flow, runs approximately tangentially to the cylinder.

When the make-up water is injected, the latter is initially let down to the condenser pressure prevailing in the mixing chamber. Thus, abrupt degassing of this water to the abovementioned $O_2$ concentration of about 1,800 ppb (at 100 mb) takes place.

Since the make-up water is considerably cooler than the saturation temperature of the condenser, the make-up water has an extracting effect In the same way as in a mixing condenser, the turbine exit steam is accordingly drawn through the steam inlet 6 into the mixing chamber 3. This effect is further boosted by two accompanying factors:

on the one hand, the appropriately configured steam inlet effects a deflection of the inflowing steam with a subsequent back-up, the latter leading to a slight increase in the mixing chamber pressure by about 1–1.5 mb, and on the other hand, the special form of the make-up water injection also causes an "entrainment effect" with respect to the steam, in the manner of a water jet pump.

The major part of the steam flowing into the mixing chamber condenses in direct contact with the make-up water. The excess quantity of steam is enriched with inert gases during the thermal balancing step. It is deflected in the mixing chamber and leaves the latter via a second opening forming the steam outlet 8. This second opening 8 is located in the condenser wall below the first opening 6. This again extends tangentially, at least at its end facing the condenser interior. As a result, at this point too, the main flow located at this point in time directly above the tube bundles 9 exerts a suction effect on the mixture which leaves the mixing chamber.

The sprayed and mixed make-up water which remains in the mixing chamber is then saturated and partially degassed—at the condenser pressure and condenser temperature.

The determining and more difficult part of the residual degassing takes place in a second stage on a purely mass-kinetic basis by diffusive transport of the dissolved gases across the gas/liquid interface. This transport process can occur only after thermal equilibrium has been reached. The working process of this second stage is substantially more expensive than that of the first stage.

Starting from a saturated make-up water, the use of a gas/liquid contact apparatus in counter-current arrangement is then appropriate to obtain the maximum separation effect. Preferably, a separation column is used which, however, requires a small quantity of high-grade steam for operation. This quantity of so-called flushing steam numerically amounts to $\leq 5\%$ of the total steam quantity required for preheating.

It should be pointed out that the use of conventional separation stages known per se, such as bubble cap trays, jet trays or perforated trays, involves a pressure drop of about 1.5 mb per separation stage. This leads to a rise in the saturation temperature and consequently to an additional consumption of high-grade steam. Particularly for low vacuum levels, low pressure-drop types of packing with a pressure drop of only about 1–1.5 mb pressure drop per meter of packing height are preferable.

In the present example, the vertically erected separation column 11 is a so-called cylindrical column which, in the case shown, contains layered packing material, called packing 12 below. This can be a loose bed, that is to say a so-called random packing. Ordered, regular packing is more suitable, which has the advantages of a higher separation efficiency at a lower pressure drop as a result of homogeneously controlled distribution. The materials used for such types of packing known per se can be stainless steel, ceramics or plastic fabrics, all of which are distinguished by good wettability in aqueous systems. At its bottommost end, this packing is held in the column by a packing grate 13.

The partially degassed make-up water, which runs out of the tapering outlet 14 of the mixing chamber 3 downwards into the separation column, is first collected in an all-round collar (not shown) and then passed into a distributor 15. This distributor 15 is provided above the packing 12. This is as a rule a channel system in which the preheated water running down is collected and distributed over the cylindrical cross-section of the column or, in the simplest case, is a perforated plate. In the latter case, the water level which stands above the distributor and is marked by the level triangle 16, serves simultaneously as a hydraulic lock for the flushing steam flowing out of the top of the packing 12.

The column is designed as a counter-current arrangement, i.e. the preheated and already partially degassed water flows downwards in the column and the flushing steam flows upwards in counter-current. In this column, the predominant part of the residual quantity of gas is eliminated from the water. The water flows downwards through a plurality of layers of the column. In the packing, the residual subcooling of the water is also eliminated. Only a small part of the packing height is required for this purpose. After thermal equilibrium, i.e. the saturation temperature, has been reached, the degassing process in the column takes place on a purely mass-kinetic basis, as already stated above.

The required height of the counter-current column depends on the inlet concentration and on the desired outlet concentration of the water. Since only a small mass flow of flushing steam flows upwards through the counter-current column against the downward-flowing water, there is no risk of flooding in the separation column.

This flushing steam is removed directly above the packing 12. For this purpose, an opening 18, from which a deaeration line 19 branches off to the condenser interior, is provided in the wall 17 of the separation column between the distributor 15 packed with a stagnant water column and the packing 12.

In this second stage, the degassing is accordingly carried out in the medium concentration range between 1,800 and, for example, 80 ppb, for which only a fraction of the total required steam is utilized. However this steam must be taken from a pressure level of the circulation, which is above the pressure level prevailing in the associated condenser.

The way in which this flushing steam is provided will be described by reference to the explanation of the third degassing stage. In contrast to conventional counter-current degassing equipment, this flushing steam is in fact not fed in directly below the packing 12.

The make-up water flowing down out of the separation column 11 passes via a cylindrical housing part 20 into a receiver 21 which is located underneath the separation column and connected thereto and in which steam-dispersing means 22 are provided and which is connected via a weir 23 to the condenser interior.

Figure 3:
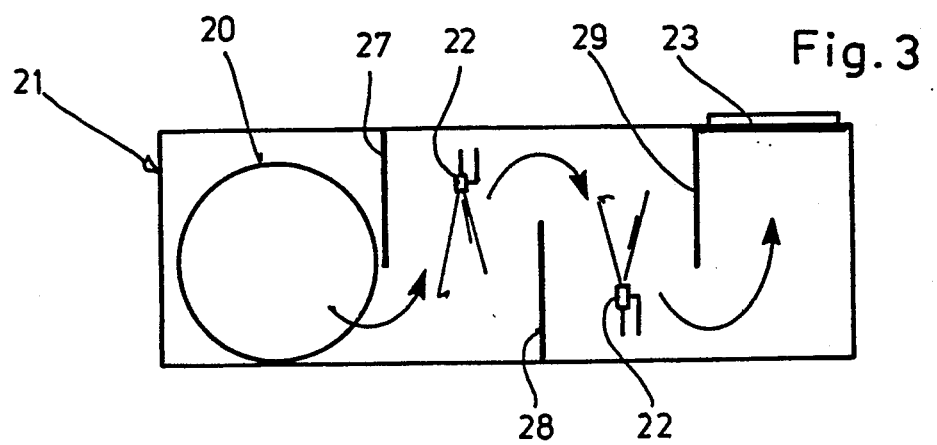
FIG. 3 shows a partial section along the line III—III in FIG. 2.

According to FIG. 3, the make-up water follows a forced path in this receiver. For this purpose, a kind of meandering flow channel ending at the weir 23 is formed by the baffles 27, 28 and 29. This weir ensures well-defined flow conditions in the system. In this channel, the residual degassing of the make-up water is carried out. This takes place by means of steam bubbles which are generated in the steam-dispersing means 22. These means are preferably commercially available two-phase nozzles which are charged with both liquid and steam. They are sized such that steam bubbles of a diameter of about 1 mm form at the outlet orifice. In principle, steam bubbles having a diameter of between 0.5 and 2 mm are suitable. In the flow channel, such steam-dispersing means 22 are provided in the two middle meanders. The nozzles themselves are arranged at a certain depth, for example 0.5 m below the water level. Each of their outlet orifices is directed horizontally, inter alia in order to prolong the residence time during the rise through the liquid.

The two nozzles are supplied, on the one hand, via a water line 24, which here branches off from the condenser bottom and in which a pump 25 is located. As an alternative, however, the water line can equally well branch off from the feed water train (not shown), namely advantageously downstream of the usual condensate pump. A restrictor element (not shown) can also be provided in this water line, in order to reduce the prevailing water pressure to the pressure required upstream of the nozzle for the generation of bubbles. On the other hand, the two nozzles are supplied via a steam line 26 which likewise as a rule contains a pressure-reducing element for providing the correct pressure. The steam source itself can be of a multiple type: thus, for example, it is possible to bleed the auxiliary steam system which is already active before the actual steam generation and which is required for providing preservation steam and/or gland steam. Other possible steam sources are fresh steam or bleed steam from the turbine installation, it only being necessary to ensure that the steam injected is always low in oxygen.

The actual thermal degassing, effected by supplying energy into the make-up water flowing slowly to the weir in the receiver, then takes place as a result of simultaneously supplying condensate and steam to the two nozzles. Due to the pressure reduction taking place in the spray nozzles, the part of the condensate introduced vaporizes and, together with the steam introduced, forms the steam bubbles of the desired diameter, which rise homogeneously through the make-up water. With respect to the residence time of the bubbles, the water depth and the bubble diameter must be mutually matched in such a way that, on the one hand, no bubbles pass with the make-up water over the weir into the condenser interior but, on the other hand, the required oxygen desorption can be carried out. The kinetics of this desorption are adequately known and do not need to be discussed in more detail at this point.

The steam consumption for the bubble formation is relatively small and amounts to about 1/1,000 of the rate of make-up water to be degassed. The liquid mass flow required for functioning of the two-phase nozzles amounts to about a hundred times the steam mass flow injected. When, after a residence time of between 5 and 10 seconds, the bubbles reach the water surface, a steam pad forms above this water surface in the receiver 21 otherwise closed on all sides, which steam pad moves against the direction of flow of the water towards the housing part 20 and then enters as flushing steam from below into the packing 12 of the second degassing stage.

Thus, the steam bubbles effect, in crossflow with the make-up water, the final degassing of the latter by lowering the dissolved inert gas contents from e.g. 80 ppb to the desired value of, for example, 7 ppb. The bubble degassing in the last stage depends only on the number of the steam-dispersing means and on the injected steam flow. The flushing steam enriched with this way has no adverse effect on the separation effect of the packing 12.

Obviously, numerous modifications and variations of the present invention are possible in the light of the above teachings. It is therefore to be understood that, within the scope of the appended claims, the invention may be practiced otherwise than as specifically described herein.

What is claimed as new and desired to be secured by Letters Patent of the United States is:

1. A process for the preheating and multi-stage degassing of make-up water by means of steam in a power generation installation, wherein in a first stage, the preheating and stripping of the gases dissolved in the make-up water proceeds on a purely thermodynamic basis, the subcooled make-up water being injected into a mixing chamber which is at least approximately under the condenser pressure and into which low-pressure waste steam is also introduced, in a second stage, the further degassing of the preheated make-up water is carried out on a purely mass-kinetic basis, the make-up water flowing downwards through an upright separation column and coming therein into intimate contact with flushing steam passed through the separation column in counter-current, and in a third stage, the make-up water leaving the separation column is treated in a receiver with steam bubbles which are generated by steam-dispersing means below the water level in the receiver, and the steam leaving the receiver forms the flushing steam for the separation column.

2. Equipment for the preheating and multi-stage degassing of make-up water by means of steam in a power generation installation for carrying out the process as claimed in patent claim 1, which comprises a mixing chamber which is located on the outside wall of the condenser of the power generation installation and communicates with the condenser interior via a steam inlet and steam outlet and in which a plurality of water injection means are arranged, the steam inlet of the mixing chamber opening towards the condenser neck, also a separation column which is located upright underneath the mixing chamber and connected thereto and which is fitted at its upper end with a water distributor, a connection to the condenser interior branching off in the wall of the separation column between the water distributor and the elements of the separation column, and a receiver which is located underneath the separation column and connected thereto and in which steam-dispersing means are fitted and which is connected via a weir to the condenser interior.

3. The equipment as claimed in patent claim 2, wherein the mixing chamber extends in the longitudinal direction of the condenser tubes.

4. The equipment as claimed in patent claim 2, wherein the mixing chamber has a cylindrical shape, both its steam inflow and its steam outflow being designed to be tangential.

5. The equipment as claimed in patent claim 2, wherein the receiver is configured as a meandering flow channel in which the steam-dispersing means are positioned one after the other in the flow direction of the condensate.

6. The equipment as claimed in patent claim 2, wherein the steam-dispersing means are two-phase nozzles which are charged both with low-oxygen steam and recirculated condensate and which are aligned with a horizontal outlet orifice.

* * * * *